June 24, 1930.　　H. L. PETERSON ET AL　　1,766,800
ASSEMBLING MACHINE
Filed Oct. 22, 1928　　2 Sheets-Sheet 1
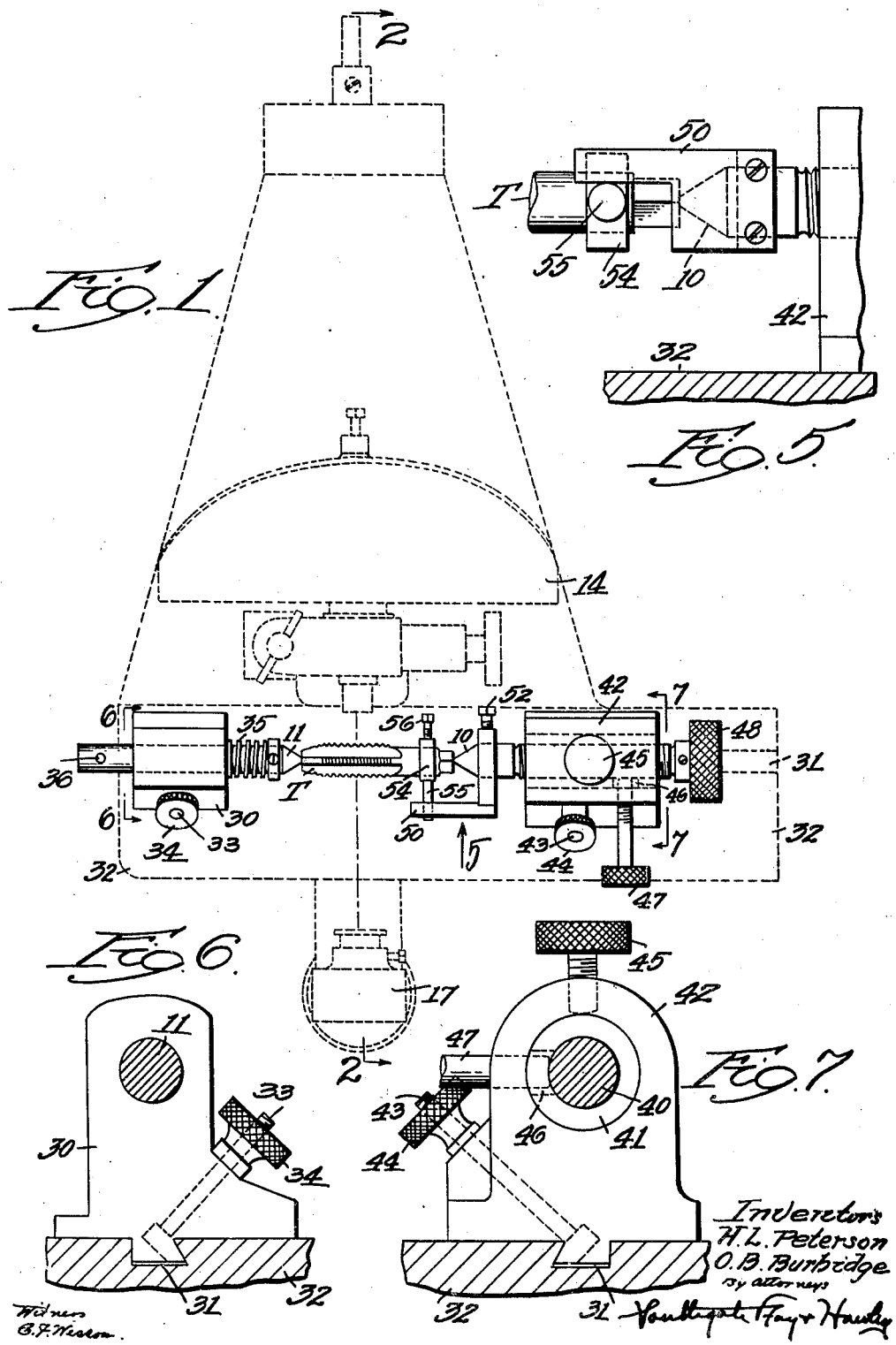

June 24, 1930. H. L. PETERSON ET AL 1,766,800
ASSEMBLING MACHINE
Filed Oct. 22, 1928 2 Sheets-Sheet 2
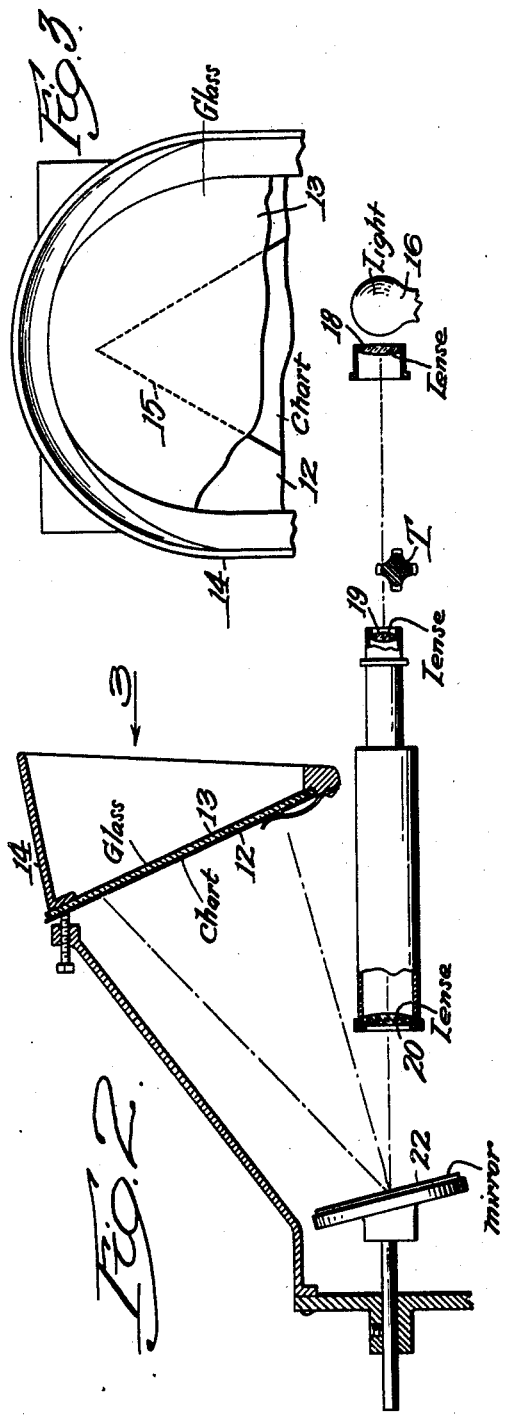
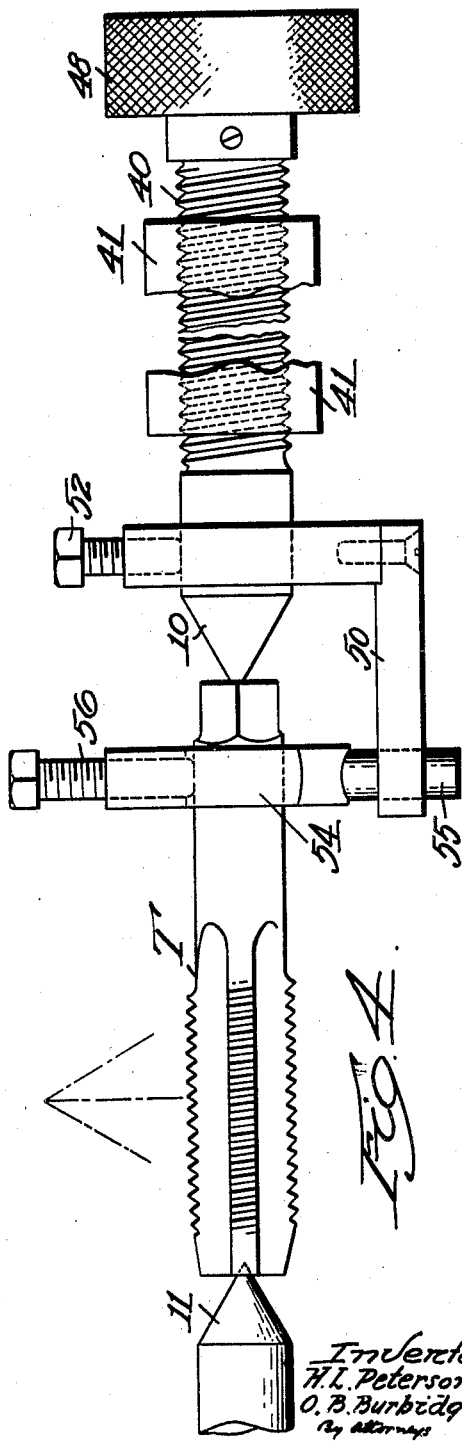

Patented June 24, 1930

1,766,800

UNITED STATES PATENT OFFICE

HAROLD L. PETERSON AND OWEN B. BURBIDGE, OF WORCESTER, MASSACHUSETTS, ASSIGNORS, BY MESNE ASSIGNMENTS, TO JOHN BATH, OF WORCESTER, MASSACHUSETTS

ASSEMBLING MACHINE

Application filed October 22, 1928. Serial No. 314,052.

This invention relates to a machine used in assembling a driving member in a definite angular position on a tap or other similar threaded work.

In the production of ground taps, the taps are commonly rough threaded in large quantities by a rough grinding operation and are thereafter finish ground as ordered. The driving members or dogs are removed from these rough ground taps when the rough threaded taps are placed in storage and must thereafter be replaced on the taps in such exact angular position that the finish grinding wheel will center accurately in the thread grooves of the rough threaded taps.

It is the object of our invention to provide mechanism by which such placing of the dogs on the taps to be finish ground may be performed quickly and with great accuracy.

With this general object in view, our invention relates to arrangements and combinations of parts which will be hereinafter described and more particularly pointed out in the appended claims.

A preferred form of the invention is shown in the drawings in which

Fig. 1 is a plan view of our improved assembling mechanism;

Fig. 2 is a diagrammatic sectional side elevation thereof, taken along the line 2—2 in Fig. 1;

Fig. 3 is a partial front elevation, looking in the direction of the arrow 3 in Fig. 2;

Fig. 4 is an enlarged plan view of the axial adjusting mechanism;

Fig. 5 is a detail front elevation, looking in the direction of the arrow 5 in Fig. 1, and Figs. 6 and 7 are detail sectional elevations, taken along the lines 6—6 and 7—7 of Fig. 1 respectively.

Referring to the drawings, I have indicated a tap T supported on a head center 10 and a tail center 11. A chart 12 is placed behind a glass plate 13 in a casing 14 and is provided with a V-shaped outline 15, which is of the exact angle of the thread of the tap to be finish ground but on a very much enlarged scale.

An electric light bulb or other source of illumination 16 is mounted at the front of the machine in a casing 17 (Fig. 1) by which it is screened from the operator. The light from the bulb 16 shines rearward through a lens 18 and across the upper surface of the tap T. The light rays then pass through magnifying lenses 19 and 20 and are reflected by a mirror 22 on to the back side of the chart 12. The image of a tooth of the tap is thus made to appear as a shadow, greatly magnified, on the chart 12 and in position for direct comparison with the standard outline 15.

The optical apparatus above described is of a general commercial type and in itself forms no part of our present invention.

The tail center 11 is slidable in a standard or bracket 30 which is adjustable in a guideway 31 (Fig. 6) in the table 32 of the machine. The stand 30 may be secured in any desired position by means of a clamping bolt 33 and nut 34. A spring 35 presses the center 11 yieldingly toward the tap T, and a pin 36 prevents displacement of the center 11.

The head center 10 has a threaded portion 40 (Fig. 4) fitting a correspondingly threaded bushing or nut 41, adapted to be clamped in a stand or bracket 42, which stand is also adjustable in the guideway 31 and is secured therein by a clamping bolt 43 and nut 44. A binding screw 45 is provided for securing the bushing 41 in fixed position in the stand 42. An opening 46 is provided in one side of the bushing 41 and a clamping screw 47 extends through the opening 46 and may be forced against the threaded portion 40 of the head center 10 to secure the same from rotation if so desired.

The center 10 is provided with a knurled head or knob 48 for convenient rotation thereof. An offset abutment or arm 50 is fixed to the head center 10 and may be in the form of an ordinary driving dog secured by a binding screw 52.

A driving member or dog 54 having a straight tail 55 is placed loosely on each tap T before the tap is mounted on the centers 10 and 11, said dog having a binding screw 56.

Having described the details of construction of our improved assembling mechanism, the manner of using the same is as follows:

A chart 12 is selected having an outline 15 corresponding to the exact thread angle of the tap to be finish ground. This chart is placed behind the glass plate 13, so that the outline 15 may be readily seen from the front of the machine. A tap T with a dog 54 loose thereon is then placed in the machine on the centers 10 and 11, the center 11 yieldingly forcing the tap against the head center 10. The tap is then turned to bring one of the lands of the tap directly above the axis and in the path of the light ray of the projector.

The center 10 is then rotated in the fixed bushing or nut 41 by the knob 48, thus moving the tap axially until the shadow of a selected tooth of the tap is exactly centered with the outline 15 of the chart. The dog 54 is then turned on the tap T until it engages the dog 50 on the head center 10. The screw 56 is then tightened and the tap is again tested for alignment with the outline on the chart.

It sometimes happens that the tightening of the screw 56 turns the tap slightly out of exact alignment. If so, the adjustment of the dog on the tap is repeated until the tap after adjustment is exactly aligned with the chart outline when the tail 55 of the tap engages the offset end of the dog 50. The tap is then removed and another tap is placed in the machine and has its dog adjusted and tightened thereon as above described.

So long as each tap is so positioned that the thread is centered with the chart outline when the dogs 54 and 50 are in contact, the taps will all be centered uniformly with respect to the grinding wheel of the finish grinding machine, after the wheel has been once centered with one of the taps thus assembled.

Axial adjustment of the tap to secure tooth alignment with the chart outline does not affect the angular setting of the dog, so long as the pitch of the thread on the center 10 is the same as the pitch of the tap, and so long as the dog 50 is fixed on the center 10 and rotates therewith.

When the machine is to be used with taps of a different pitch, the center 10 and its bushing 41 are removed from the machine, and another center and bushing of a pitch corresponding to the new lot of taps is substituted.

It will thus appear that we have provided an extremely simple mechanism by which taps and dogs may be assembled in an exact desired angular relation and with extreme accuracy.

Having thus described our invention and the advantages thereof we do not wish to be limited to the details herein disclosed otherwise than as set forth in the claims but what we do claim is:—

1. In an assembling machine, means to position a driving member relative to a threaded tap, comprising means to display an enlarged standard thread outline, means to rotatably support said threaded tap in said machine, means to project an enlarged image of a selected tooth of said tap on said standard outline, and means to adjust said tap axially to align the image of a selected tooth with said standard outline, and means to fix the position of said driving member relative to said tap.

2. In an assembling machine, for assembling a driving member and tap in combination, means to display an enlarged standard thread outline, means to rotatably support a threaded tap in said machine, means to project an enlarged image of a selected tooth of said tap on said standard outline, and means to adjust said tap axially to align the image of a selected tooth with said standard outline, said adjusting means comprising a head center threaded in a supporting bearing and a spring-pressed tail center cooperating therewith, and means to fix the position of said driving member relative to said tap.

3. The combination in an assembling machine as set forth in claim 2, in which the thread of said head center is of the same hand and pitch as the tap to be positioned thereby.

4. The combination in an assembling machine as set forth in claim 2, in which the thread of said head center is of the same hand and pitch as the tap to be positioned thereby, and in which an offset abutment member is fixed to said head center and is movable angularly therewith.

5. The combination in an assembling machine as set forth in claim 2, in which the thread of said head center is of the same hand and pitch as the tap to be positioned thereby, and in which said head center is threaded in a bushing removably mounted in said supporting bearing and readily replaceable therein.

6. In an assembling machine, a screen having a position indicating means thereon, means to project an outline of a tap tooth on said screen, means to rotatably support a tap in position for projection on said screen, said tap having a dog loosely mounted thereon, and means to locate said dog in predetermined angular relation to said tap when the projection of a selected tooth is in a predetermined position on said screen.

7. The combination in an assembling machine as set forth in claim 6, in which means is provided for adjusting said tap axially while preserving the angular and axial relation of said setting means to said head center.

In testimony whereof we have hereunto affixed our signatures.

HAROLD L. PETERSON.
OWEN B. BURBIDGE.